United States Patent [19]

Helman et al.

[11] 4,442,827
[45] Apr. 17, 1984

[54] SOLAR HEAT COLLECTOR

[75] Inventors: Edward R. Helman; Herbert A. Helman; Henry B. Holtschneider; Sidney P. Buford, all of Baltimore; Donald C. Fava, Timonium; Jeffrey N. Christopher, Baltimore, all of Md.

[73] Assignee: Supreme Associates, Baltimore, Md.

[21] Appl. No.: 309,752

[22] Filed: Oct. 8, 1981

[51] Int. Cl.³ .............................................. F24J 3/02
[52] U.S. Cl. .................................... 126/430; 126/429; 126/444; 126/449; 126/450; 52/522; 52/536
[58] Field of Search ............... 126/450, 429, 431, 430, 126/444, 449, 424, 422, 418; 52/531, 533, 534, 557

[56] References Cited

U.S. PATENT DOCUMENTS

| 246,626 | 9/1881 | Morse . | |
|---|---|---|---|
| 2,288,465 | 6/1942 | Knudsen | 20/56.5 |
| 2,595,905 | 5/1952 | Telkes | 126/270 |
| 2,902,028 | 9/1959 | Manly | 126/424 X |
| 3,863,621 | 2/1975 | Schoenfelder | 126/270 |
| 3,960,205 | 6/1976 | Laing | 126/270 |
| 3,971,359 | 7/1976 | Bourne | 126/270 |
| 4,014,313 | 3/1977 | Pedersen | 237/1 A |
| 4,019,496 | 4/1977 | Cummings | 126/270 |
| 4,050,443 | 9/1977 | Peck et al. | 126/270 |
| 4,068,652 | 1/1978 | Worthington | 126/431 |
| 4,069,809 | 1/1978 | Strand | 126/270 |
| 4,076,025 | 2/1978 | Parker | 126/270 |
| 4,083,360 | 4/1978 | Courvoisier et al. | 126/271 |
| 4,088,117 | 5/1978 | Keyes | 237/1 A |
| 4,106,483 | 8/1978 | Barber, Jr. | 126/271 |
| 4,111,183 | 9/1978 | Haberthier | 126/270 |
| 4,111,188 | 9/1978 | Murphy, Jr. | 126/271 |
| 4,183,350 | 1/1980 | Staudacher | 126/270 |
| 4,186,722 | 2/1980 | Muessig | 126/270 |
| 4,211,213 | 7/1980 | Nissen et al. | 126/270 |
| 4,212,289 | 7/1980 | Hebert | 126/430 X |
| 4,212,292 | 7/1980 | Reinert | 126/270 |
| 4,219,009 | 8/1980 | Palmer | 126/422 |
| 4,220,137 | 9/1980 | Tesch et al. | 126/270 |
| 4,220,139 | 9/1980 | Ramsden | 126/441 |
| 4,226,225 | 10/1980 | Niedermeyer | 220/89 A |
| 4,228,789 | 10/1980 | Kay | 126/271 |
| 4,232,731 | 11/1980 | Kaplow et al. | 165/48 S |
| 4,237,861 | 12/1980 | Fayard et al. | 126/270 |
| 4,237,865 | 12/1980 | Lorenz | 126/439 |
| 4,271,819 | 6/1981 | Farrell | 126/431 X |
| 4,296,736 | 10/1981 | Soot | 126/438 |
| 4,327,708 | 5/1982 | Taylor | 126/431 X |
| 4,351,320 | 9/1982 | Tetirick | 126/429 |

FOREIGN PATENT DOCUMENTS 2624646 12/1977 Fed. Rep. of Germany .

Primary Examiner—Larry Jones
Attorney, Agent, or Firm—Pollock, Vande Sande & Priddy

[57] ABSTRACT

A compact, self-contained solar heat collector is disclosed which is particularly suited for addition to new or existing structures in the form of window shutters, exterior siding, awnings, columnar elements and the like. The exterior glazing (32) of the collector includes undulating transverse pane segments (36, 38, 118, 156), the angle of which is chosen to optimize insolation during winter months. Beneath the preferably sharp peaks and valleys of such undulations is positioned a heat absorption, storage and exchange assembly (42-64) which defines an enclosed heat transfer cavity (42, 122, 134, 142) through which a heat transfer fluid such as air is directed.

12 Claims, 14 Drawing Figures

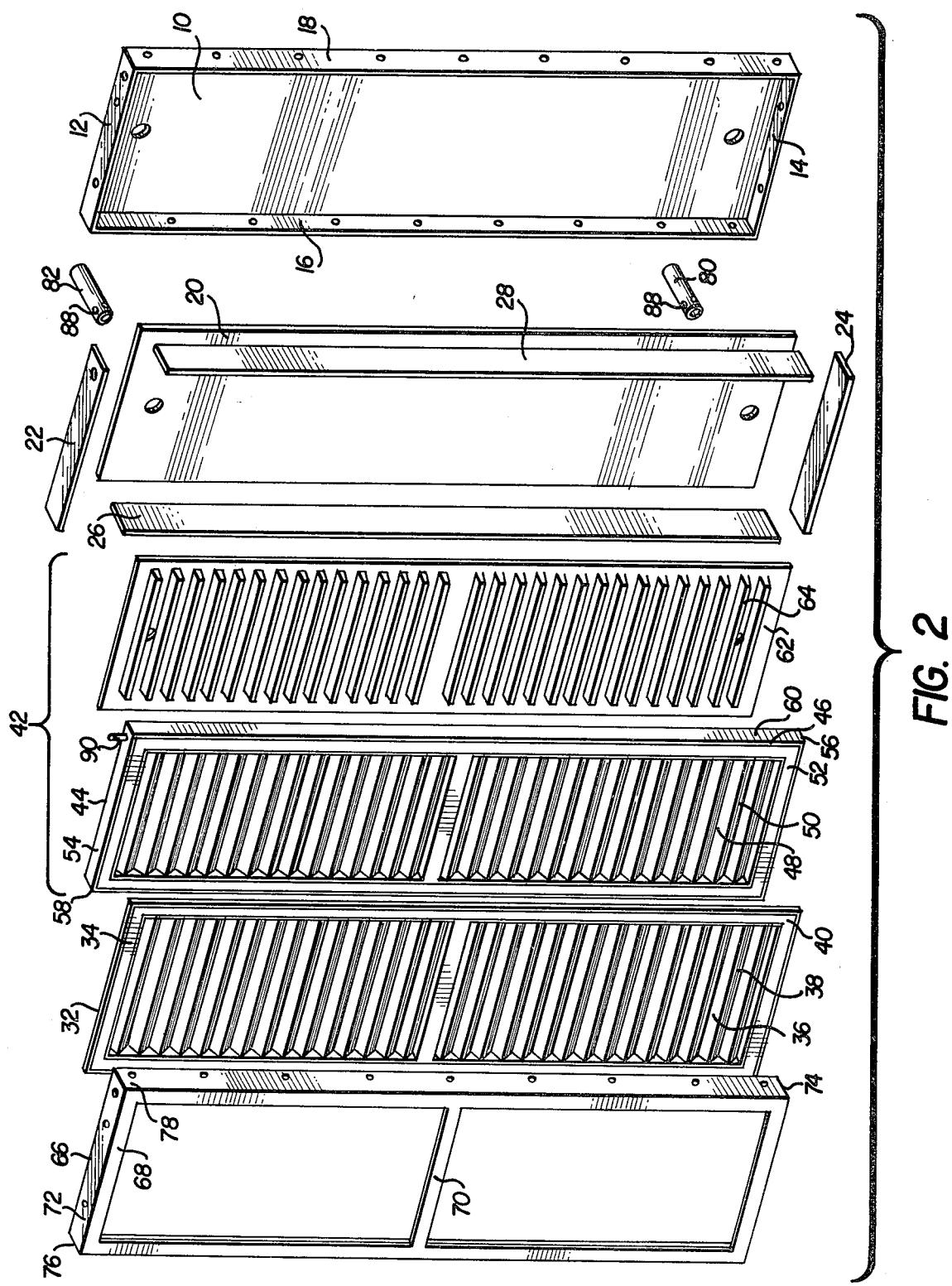

SOLAR HEAT COLLECTOR

DESCRIPTION

Technical Field

The present invention concerns devices for heating the interiors of buildings such as residences and offices. More particularly, the invention relates to an attractive, improved solar heat collector for providing supplemental heating to a building, thereby reducing its consumption of energy from other sources without detracting from the exterior appearance of the building.

Background Art

Passive and active solar heating systems for residential and other buildings have been known for many years and have been the subject of numerous patents and publications around the world since at least the latter part of the nineteenth century. More recently, due to the dramatic increase in the cost of conventional energy sources such as fossil fuels, interest in solar heating systems has increased manyfold. A useful summary of the state of solar heating technology is found in *Solar Energy Handbook, Theory and Applications*, Chilton Book Company, Radnor, PA (1979), the contents of which are incorporated herein by reference.

Although significant advances have been made in using the energy of the sun, currently available solar collectors for heating liquid and gas are often so complex and expensive or so unattractive in appearance that many residence and office building owners are reluctant to add them to existing buildings or include them in new construction. Thus, a need has continued to exist for a compact, economical and attractive solar heat collector which can be added to an existing building or included in a new building without extraordinary expense and without detracting greatly from the appearance of the building following installation of the collector.

Disclosure of the Invention

An object of the present invention is to provide an improved solar heat collector which is simple in construction, affordable in cost and effective in providing supplemental heat for buildings such as private residences.

A further object of the invention is to provide such a solar heat collector which has a pleasing, as well as functional, exterior appearance so that it may be readily incorporated on or into the exterior of a building without detracting from its appearance.

A further object of the invention is to provide such a solar heat collector which is essentially self-contained and therefore easily installed.

Yet another object of the invention is to provide such a solar heat collector which has a built-in ability to retain heat for continued delivery to the building during cloudy periods or after sunset.

These objects of the invention are given only by way of example; therefore, other desirable objectives and advantages inherently achieved by the disclosed structure may occur or become apparent to those skilled in the art. Nonetheless, the scope of the invention is to be limited only by the appended claims.

In a preferred embodiment of a solar heat collector according to the invention, a housing is provided having a front surface, a back surface and interior peripheral walls extending therebetween. Within these walls is located at least one heat absorber element having a front surface with a low thermal emittance and a high solar absorptance and a rear surface with a high thermal emittance and a low solar absorptance. Also located within the walls of the frame but spaced from the back surface of the heat absorber element is a heat storage element having a front surface with a high thermal emittance and a low solar absorptance and a rear surface with a higher solar absorptance and a low thermal emittance. The heat absorber element and heat storage element are joined so that they enclose a heat transfer cavity between the surfaces having a high thermal emittance, thereby defining an air flow channel. To provide additional surface area for heat transfer, generate turbulent air flow to enhance heat transfer and also to increase the mass of the heat storage element, fins may be provided on the front surface of the heat storage element, extending across the heat transfer cavity toward the rear surface of the heat absorber element. Additional fins may also be provided on the rear surface of the heat absorber element, if desired. Ducts are provided for directing a flow of air through the heat transfer cavity so that the air is heated as it passes over the surfaces having high thermal emittance. Air flow may be achieved by thermal convection or by the use of a fan.

To protect the front surface of the heat absorber element and to reduce heat losses due to wind, convection and thermal radiation, at least one light-transmitting cover is provided which is spaced from the front surface of the heat absorber element. To optimize heat absorption at solar wave lengths, the heat absorber element preferably comprises a plate having transverse undulations with the uppermost portions of the undulations angled to receive the sun's radiation most directly during winter months. Similarly, the light-transmitting cover preferably is provided with complementary undulations having uppermost surfaces positioned to transmit solar energy to the uppermost surfaces of the heat absorber element with a minimum of reflection. To further reduce thermal radiation from the front surface of the heat absorber element, a plurality of transversely extending, light-transmitting strips or slats may be positioned between the light-transmitting cover and the uppermost surfaces of the undulations on the heat absorber element. To account for changes in the position of the sun during the winter months, means may be provided for adjusting the angle of such light transmitting strips relative to the heat absorber element to reduce reflection and also minimize thermal radiation.

To facilitate installation of a solar heat collector according to the invention as siding on a building, the heat absorber element and heat storage element may be elongated horizontally and the heat absorber set at an angle to optimize absorption of solar energy. In such an embodiment, the flow channel or cavity defined between the heat absorber element and the heat storage element is open at its horizontally spaced ends and upright manifolds are provided at each end to direct cool air into one end and receive heated air at the other end of the flow channel.

In some instances, it may be desirable to increase the air flow capacity of a solar heat collector according to the invention. For this purpose, air flow may be directed between the front surface of the heat absorber element and the back surface of the light-transmitting cover on the collector. It is also within the scope of the invention to provide a further flow channel at the back surface of the heat absorber element. Air flowing through this flow channel may then be mixed with higher temperature air coming from the heat transfer cavity and/or from the flow channel behind the light transmitting cover.

BRIEF DESCRIPTION OF THE DRAWINGS

FIG. 2 shows an exploded, perspective view of the heat collector illustrated in FIG. 1.

BEST MODE FOR CARRYING OUT THE INVENTION

Figure 1:
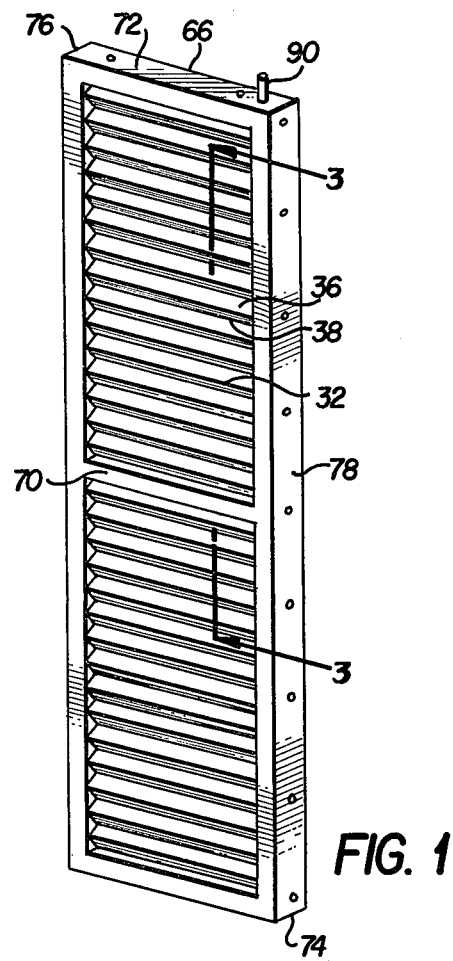
FIG. 1 shows a perspective view of a solar heat collector according to the invention which has a general exterior configuration similar to that of a conventional window shutter or louvered door.

The following is a detailed description of the preferred embodiments of the invention, reference being made to the drawings in which like reference numerals identify like elements of structure in each of the several Figures.

Figure 3:
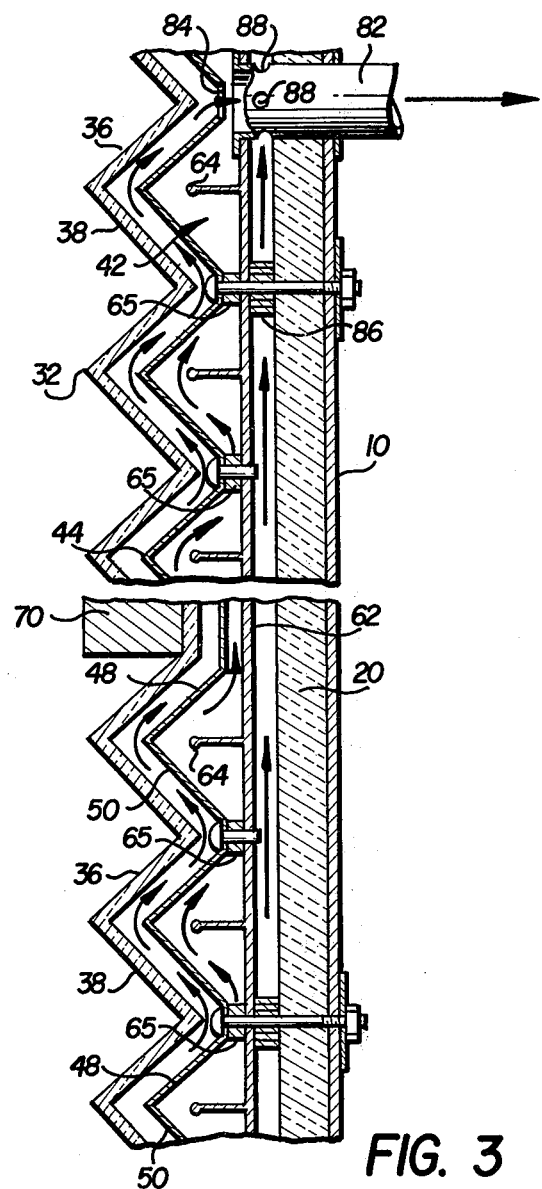
FIG. 3 shows a fragmentary elevation section view taken along line 3—3 of FIG. 1.

FIGS. 1 to 3 illustrate an embodiment of the invention having an external configuration similar to a conventional shutter or louvered door and being particularly suited for mounting next to windows, doors and the like. A flat plastic or metal housing back 10 is provided to which are attached integral, outwardly extending top wall 12, bottom wall 14 and side walls 16, 18 to define a shallow box. Within the box are positioned a flat back wall insulation panel 20 such as foil-backed rigid polyurethane foam or styrofoam. A top wall insulation panel 22, bottom wall insulation panel 24 and side wall insulation panels 26, 28 are installed adjacent walls 12-18 to define a compartment having a rectangular front opening. A preferably transparent glazing panel 32, made from a material such as molded plexiglass, is provided to close the front opening of the compartment. Panel 32 comprises a rigid peripheral rectangular frame 34 within which are supported a plurality of transverse, light-transmitting pane segments 36, 38 to define an air impervious panel. Pane segments 36, 38 are interconnected to define a zigzag or undulating cover having sharp peaks and valleys, as most clearly seen in FIG. 3. The embodiment illustrated in FIGS. 1-3 is intended for installation in a vertical orientation; thus, the uppermost pane elements 36 are set at an angle which is chosen to maximize insolation at the given latitude during the winter months. Sharp peaked undulations or corrugations are preferred, as illustrated, to provide an essentially V-shaped cross-section as shown in FIG. 3 having, for example, a base approximately 2 inches in length and an altitude approximately 1¼ inches in length. In actual practice, ⅛ inch plexiglass has been found to be suitable for glazing panel 32. Another suitable material is polyvinylidene fluoride from which panel 32 may be formed by vacuum forming or pressure molding techniques. Elements 32-40 may be formed as a unitary panel. The front surface of peripheral frame 34 is provided with a gasket of suitable composition which seals against a cover to be described subsequently, thereby reducing leakage past glazing panel 32 into the interior of the housing.

Behind glazing panel 32 is positioned a heat absorption, storage and exchange assembly 42 which comprises a heat absorber panel or element 44. A peripheral, rectangular frame 46 surrounds panel 44 and supports a plurality of transverse, heat-absorbing plate segments 48, 50 to define an air-impervious absorber panel. Plate segments 48, 50 are interconnected in a zigzag or undulating manner which complements the orientation of light-transmitting pane segments 36, 38. Preferably, plate segments 48, 50 are made from a metal such as aluminum which is provided on its front face with a selective coating having a low thermal emittance in the range of 0.10 to 0.12 and a high solar absorptance in the range of 0.85 to 0.96. Such selective coatings are known to those skilled in the art. One which has proven effective is "DeRusto" paint from Master Bronze Powder Company of Chicago Heights, Ill. 60411. On the other hand, the rear surface of heat absorber panel 44 is coated or treated to provide a high thermal emittance in the range of 0.85 to 1.0 and a low solar absorptance in the range of 0.10 to 0.15. To achieve these characteristics, the rear surface of panel 44 may be unpainted, anodized aluminum or mill-finish aluminum. To speed up heat transfer through panel 44, it preferably has a thickness of approximately 0.020 inches when aluminum is used.

A peripheral gasket 52 is attached to the front surface of rectangular frame 46 in position to seal to the rear face of rectangular frame 34 on glazing panel 32. Extending rearwardly from and formed integrally with rectangular frame 46 are a top wall 54, bottom wall 56 and side walls 58, 60. By means of a peripheral gasket or other suitable seal, not illustrated, walls 54-60 are sealed to a heat storage plate or element 62 made from a metal such as aluminum and having a thickness substantially greater than that of absorber panel 44. The front surface of heat storage plate 62 is coated or treated to provide a high thermal emittance and a low solar absorptance, as is the rear surface of absorber panel 44. Similarly, the rear surface of heat storage plate 62 is provided with a selective coating having a high solar absorptance and a low thermal emittance. Heat transfer into the heat transfer cavity is maximized and heat loss is minimized by this unique arrangement. Preferably, plate 62 is at least 0.050 inches in thickness to provide a significant heat storage capacity to permit continued delivery of warm air to the building during cloudy periods or after sunset. Plate 62 also may be provided with integral, forwardly extending fins 64 which protrude into the heat transfer cavity defined between panels 44 and 62 toward the peaks defined between plate segments 48, 50. Fins 64 improve the heat transfer area of storage plate 62, generate turbulence to improve heat transfer and also provide additional mass for heat storage. While it is preferred that such fins be provided on heat storage plate 62 alone, it is also possible to provide them on the rear surface of heat absorber panel 44 without departure from the scope of the present invention. Between fins 64, heat absorber panel 44 is spaced from heat storage plate 62 by transversely separated spacers 65 secured by suitable fasteners such as rivets or screws. To facilitate heat transfer to storage plate 62, spacers 65 should have high thermal conductivity. Storage plate 62 preferably is solid metal; however, it may also comprise a hollow compartment filled with a phase-change heat storage material such as Glauber's salt. To minimize condensation within the heat transfer cavity, a dessicant packet may be included.

The combination of elements 44–64 may be placed with the rear surface of heat storage plate 62 directly in contact with the front surface of insulation panel 20 and the outer surfaces of walls 54–60 contacting the outer surfaces of insulation panels 22–28. Or, as will be described subsequently, the rear surface of heat storage plate 62 may be spaced somewhat from the front surface of insulation panel 20 to provide an additional air flow channel.

The assembly of FIGS. 1–3 is completed by an exterior cover and frame member 66 which includes a plastic or metal peripheral frame 68 and a central horizontal frame member 70. A top wall 72, bottom wall 74 and side walls 76, 78 are formed integral with peripheral frame 68 and project rearwardly to telescopically mate with the outside surfaces of walls 12–18. When this assembly is completed, peripheral gasket 40 on the front surface of glazing panel 32 seals against the rear surface of cover 66.

To admit a flow of air through the heat transfer cavity of assembly 42, a tubular inlet duct 80 is provided at the lower end. Duct 80 extends from the building interior through housing back 10, insulation panel 20 and heat storage plate 62 via appropriate seals, not illustrated. Similarly, at the upper end of the assembly, a tubular outlet duct 82 is provided, as shown in FIGS. 2 and 3. To prevent flow reversals, a check valve, not shown, may be included in duct 80. Flow through the assembly may be established in use by simple thermal convection or by the use of a low power, temperature controlled fan as illustrated schematically in FIG. 5, for example.

Additional air flow through the solar heat collector may be obtained between light transmitting pane segments 36, 38 and heat absorbing plate segments 48, 50, by providing a plurality of openings 84 through absorber panel 44 in the valleys between a pair of heat absorbing plate segments 48, 50 at the upper and lower ends of the assembly. The spacing between light-transmitting pane 32 and heat absorber panel 44 may be adjusted for adequate flow area; however, the greater this spacing, the less heat will be absorbed at plate segments 48, 50. In FIG. 3, openings 84 are shown only at the upper end of the assembly, it being understood that similarly positioned openings would be placed opposite inlet duct 80 at the lower end of the assembly. Still further air flow capacity may be provided between the rear surface of heat storage plate 62 and the front surface of insulation panel 20. To do this, spacers 86 may be installed between these surfaces to position heat storage plate 62 an appropriate distance, such as ¼ inch, in front of insulation panel 20. Inlet ducts 80, 82 are modified in this situation by the provision of radial holes 88 which allow parallel flow of air through assembly 42 and between assembly 42 and insulation panel 20. An advantage of this latter arrangement is that the relatively cooler air flowing behind heat storage plate 62 may be mixed with the hotter air leaving assembly 42 before the air is conveyed to the interior of the building. To prevent overpressurization of the interior of assembly 42, a thermally-actuated vent valve 90, of common design, may be provided at the top of assembly 42 as illustrated schematically in FIGS. 1 and 2.

Figure 4:
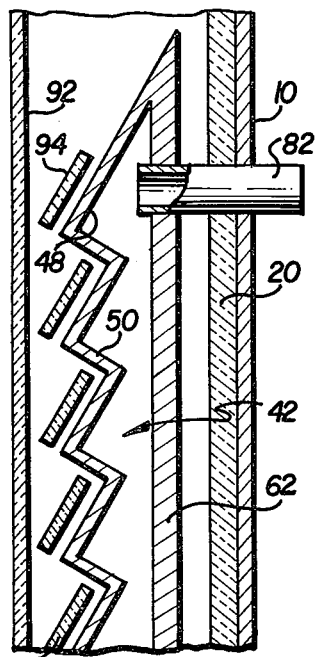
FIG. 4 shows a fragmentary elevation section of a modified solar heat collector according to the invention.

FIGS. 4–14 illustrate additional applications and features of the invention. In FIG. 4, undulating glazing panel 32 has been replaced by a combination of a flat plate glazing panel 92 and a plurality of transversely extending, individual panes 94 which are positioned in front of the uppermost heat absorbing plate segments 48 of heat absorber panel 44. This arrangement is not quite as efficient as that illustrated in FIGS. 1–3; however, the presence of individual panes 94 helps to reduce losses due to thermal radiation.

Figure 5:
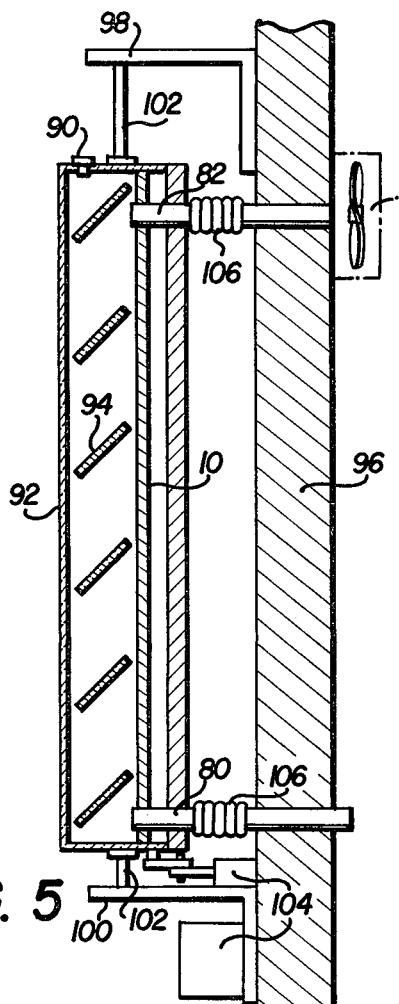
FIG. 5 shows a fragmentary elevation section of a solar heat collector according to the invention which includes means for tracking the movement of the sun.

FIG. 5 illustrates an embodiment of the invention mounted on the wall 96 of an existing structure. A pair of brackets 98, 100 are provided between which a pair of stub shafts 102 support a solar heat collector according to the invention, illustrated only schematically in this instance. A sun tracking motor and mechanism 104, of known design, are provided to adjust the position of the heat collector about a vertical axis as the sun moves during the day. To accommodate the movement of the collector, flexible couplings 106 are provided in ducts 80, 82. FIG. 5 also illustrates a typical installation of a fan 108 for forcing air through ducts 80, 82 to and from the solar heat collector.

Figure 6:
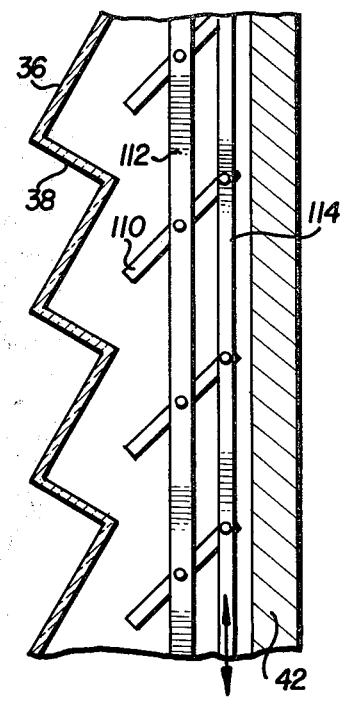
FIG. 6 shows a fragmentary elevation section of an embodiment of the invention including adjustable light transmitting slats.

In FIG. 6, assembly 42 has been modified to include a flat front surface, and a plurality of individual panes 110 have been pivotably mounted at either end on support rods 112, only one of which is illustrated. Panes or louvres 110 are positioned in front of the heat absorbing surface of assembly 42 and by moving an actuator link 114, their position may be adjusted as the sun moves to reduce reflection and thermal radiation losses and thereby maximize the heat transmitted to assembly 42.

Figure 9:
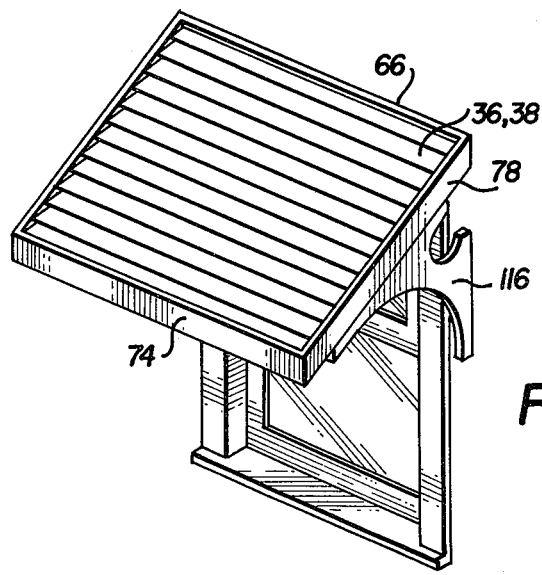
FIG. 9 shows a perspective view of a window awning embodying a solar heat collector according to the invention.
Figure 7:
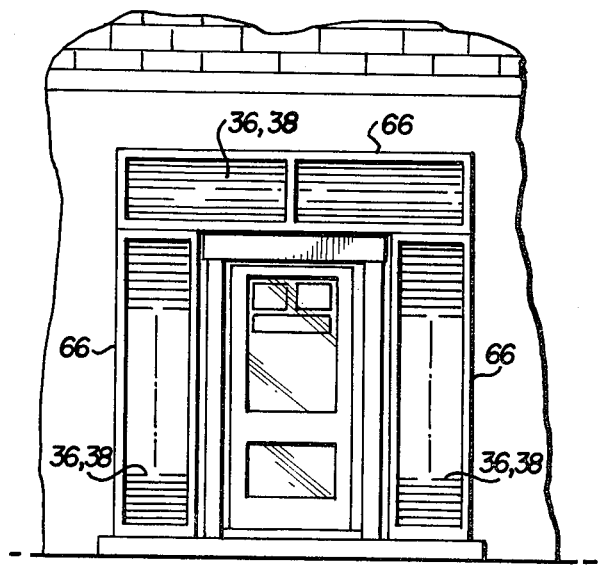
FIG. 7 shows one application of solar heat collectors according to the invention in which they are installed as shutters surrounding an entrance.
Figure 8:
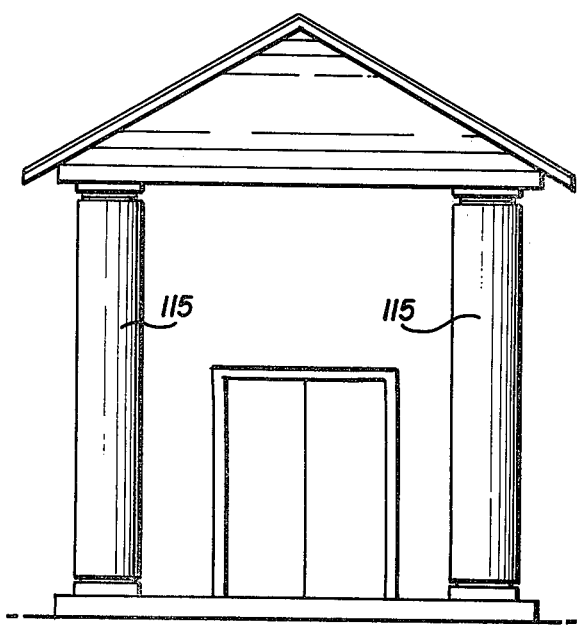
FIG. 8 shows an elevation view of a building entrance having columnar supports within which solar heat collectors according to the invention may be provided.

FIG. 7 shows a typical installation of a solar heat collector of the type illustrated in FIGS. 1–6 in which the solar heat collectors have been installed beside and above an entrance to a building. In FIG. 8, a building entrance of the type having a portico supported by columns 115 is illustrated. Although the details of this installation are not illustrated for the sake of simplicity, those skilled in the art will appreciate that several solar heat collectors of the type shown in FIGS. 1–6 may be arranged vertically in a more or less cylindrical configuration which may then be surrounded by a transparent or translucent tubular cover having any desired exterior appearance. Or, it is within the scope of the invention to form the solar heat collector itself in a tubular configuration in which the various panels, plates and flow channels curve around the circumference of the collector. In FIG. 9, a collector according to the invention is supported by a pair of brackets 116 in position to serve as an awning for a window and a heat collector for heating the interior of the building.

Figure 10:
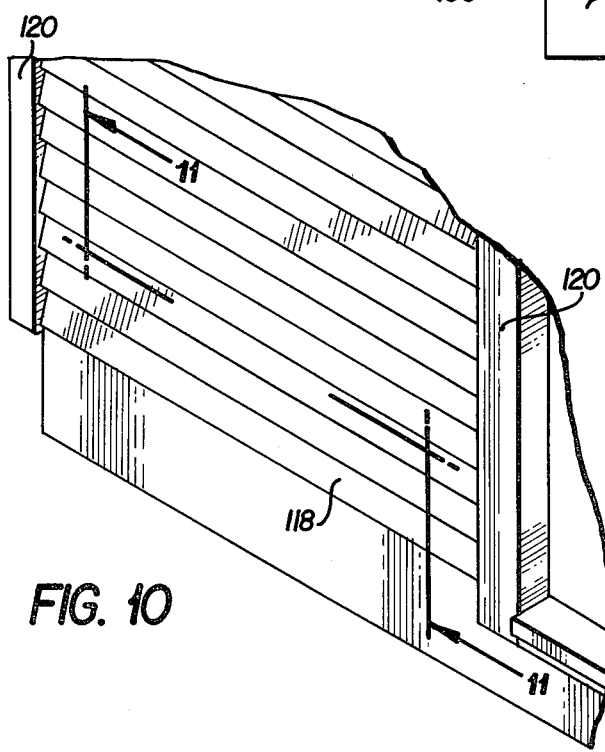
FIG. 10 shows a fragmentary perspective view of a structure embodying solar heat collectors according to the invention which have been installed as siding elements.
Figure 11:
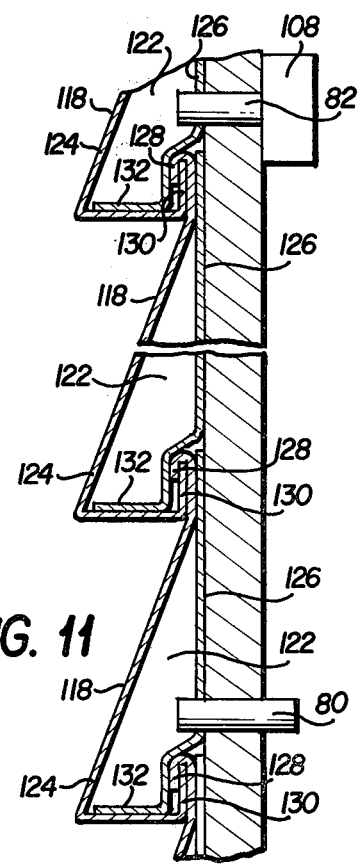
FIG. 11 shows a section view taken along line 11—11 of FIG. 10.
Figure 12:
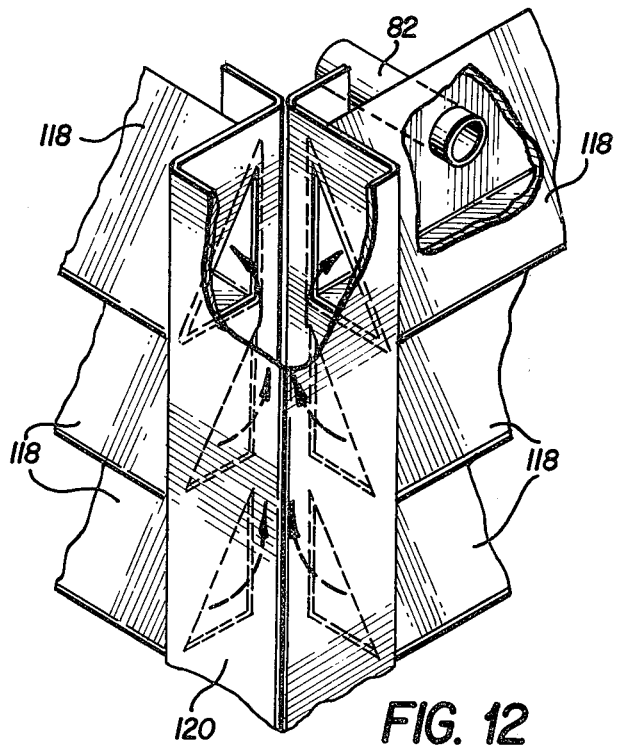
FIG. 12 shows a fragmentary, perspective view of a combined flow manifold and architectural trim element used with the solar heat collector illustrated in FIGS. 10, 11, 13 and 14.

FIGS. 10–14 illustrate a further application of the invention in which solar heat collectors are incorporated in the siding elements of a building. The combined siding and heat collectors according to the invention comprise a plurality of interlocking siding elements 118 which are attached to the frame of the building in the manner of conventional metal, plastic or metal and plastic siding so that their ends are butted against vertical trim elements 120 such as those commonly seen at the corners or around the doors and windows of a dwelling. In FIGS. 11 and 12, the adaptation of this structure according to the invention may be clearly seen. Each siding element 118 comprises a horizontally extending heat transfer cavity 122 enclosed between (a) an exterior heat collector plate 124 angled appropriately to receive heat from the sun during winter months and (b) an interior heat storage plate 126 angled more or less vertically to mate with the exterior of the building. The interior and exterior surfaces of collector plate 124 and storage plate 126 are provided with selective coating or treatments of the type previously described in order to optimize transmission of heat into heat transfer volume 122 but minimize its loss therefrom. Collector plate 124 is provided with an outwardly facing and downwardly opening hook flange 128 at its upper edge and an inwardly facing and upwardly extending flange 130 at its bottom edge, which interlock in a manner similar to that on conventional metal or plastic siding. Storage plate 126 is provided at its lower edge with an outwardly extending flange 132 which mates with an inwardly extending bottom wall of collector plate 124 to ensure the airtightness of heat transfer cavity 122.

As shown in FIG. 12, the vertical trim elements 120 are hollow in accordance with the invention to provide manifolds each having side openings to which siding elements 118 abut or into which siding elements 118 fit to establish flow paths from the siding elements into the manifolds. At one end of the lowermost siding element, not illustrated, an inlet duct 80 opens into its heat transfer cavity 122. This arrangement permits flow of air through duct 80 into the lowermost siding element, from that siding element into the adjacent manifold trim 120 and upwardly into other siding elements connected to the manifold. The air then flows horizontally through heat transfer cavity 122 of each siding element absorbing heat continuously until it reaches the opposite end, as illustrated in FIG. 12. There the air from all heat transfer cavities 122 flows into another vertical manifold 120 and upwardly through that manifold toward an outlet manifold 82 which opens into the uppermost siding element 118. Thus, when the combined siding elements and solar heat collectors according to the invention are installed in the manner shown in FIGS. 10–12, air flowing through heat transfer cavities 122 is heated and returned to the interior of the building. While application of the invention to horizontal siding elements is shown here, those skilled in the art will appreciate that panels embodying the invention may be made in any convenient size having an outer surface which blends into the exterior of the building. The heat transfer cavities may be horizontal, as in FIGS. 10–13 or vertical as in FIGS. 1–9. The invention may also be incorporated in roofing elements of panels.

Figure 13:
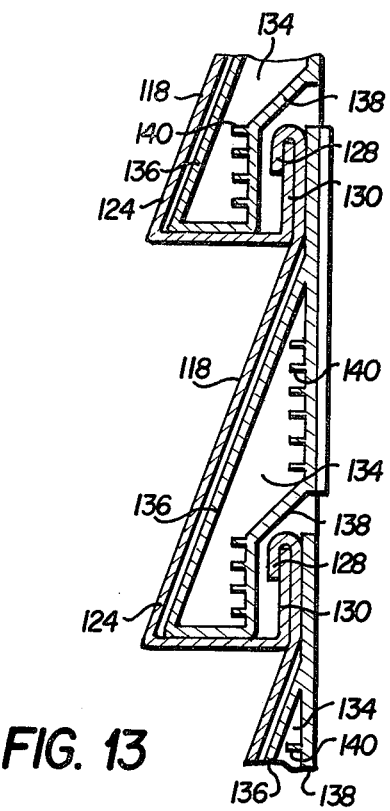
FIGS. 13 and 14 show fragmentary elevation sections of other embodiments of the invention suitable for use as siding on a structure.

FIG. 13 shows a modified version of the combined siding elements and solar heat collectors illustrated in FIGS. 10–12. A separate heat absorption, storage and transfer assembly 134 is enclosed within each exterior heat collector plate 124. In this instance, plate 124 may be made from transparent or translucent material such as plastic, if desired. Each assembly 134 comprises a horizontal heat absorbing panel 136 which is spaced from and essentially parallel to the front surface of collector plate 124. Panel 136 preferably is made from a metal such as aluminum and is formed integrally with a horizontally extending heat storage panel 138 to define an enclosed heat transfer cavity. As illustrated, panel 138 includes a pair of horizontally spaced vertical sections joined by a laterally extending section, in order to provide clearance for the joint between successive solar heat collectors. To optimize heat transfer in the manner previously described, a plurality of fins 140 may be provided on the front surface of horizontal heat storage panel 138. The installation and operation of a solar heat collector of the type illustrated in FIG. 13 is the same as that previously described with regard to FIGS. 10—12.

Figure 14:
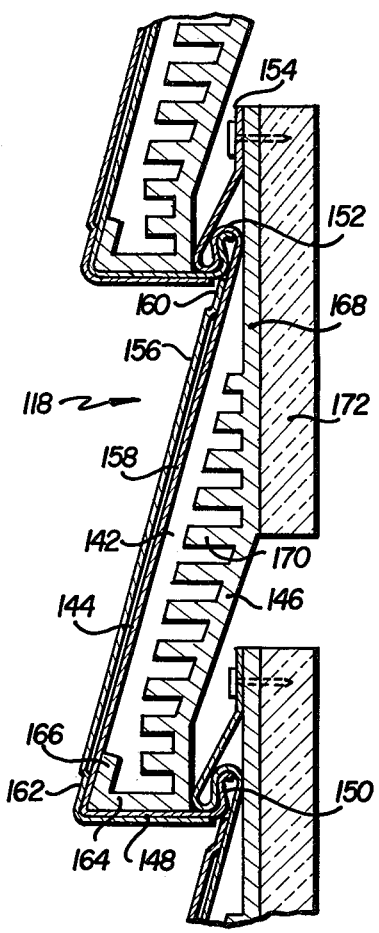

FIG. 14 shows a further modification of the combined siding elements and solar heat collectors illustrated in FIGS. 10—12. A horizontally extending heat transfer cavity 142 is defined between a horizontally extending heat collector plate 144, set at the appropriate angle for maximum isolation and provided with selective coatings or treatments as previously described; and a horizontally extending heat storage plate 146, also provided with selective coatings or treatments. The horizontally extending bottom flange 148 of collector plate 144 has a width chosen to set the desired angle of plate 144. At the innermost edge of flange 148, an upwardly extending horizontal snap flange 150 is provided which snaps into a downwardly opening horizontal snap slot 152 provided at the upper end of each collector plate 144. Above slot 152, collector plate 144 includes an attachment flange 154. Collector plate 144 may be made from metal, plastic or a combination of the two. Storage plate 146 typically is metal.

A thin, essentially rigid transparent or translucent glazing film 156 is attached to but spaced from the outer surface of collector plate 144 to define a narrow air channel 158. Polyvinylidene fluoride plastic can be used for this purpose. The spacing between film 156 and collector plate 144 may be maintained at approximately one thirty-second of an inch by providing on the back side of film 156 or on the front side of collector plate 144 a plurality of small protrusions or ridges (not illustrated) using conventional metal or plastic forming techniques. Film 156 may be attached to collector plate 144 along its upper edge 160 and its lower edge 162, using any convenient technique such as adhesive, heat bonding or mechanical edge clamps.

The lower end of storage plate 146 includes an outwardly extending horizontal flange 164 having an angled flange 166 at its outer edge, to provide an air tight fit to collector plate 144 and flange 148. At its upper end, storage plate 146 includes an upwardly extending attachment flange 168, the exterior surface of which engages collector plate 144 where snap slot 152 and attachment flange 154 are formed. To assemble the device to a building exterior, nails are driven through flanges 154 and 168 in a manner similar to that used for conventional siding. The exterior surface of storage plate 146 may be provided with fins 170, projecting into heat transfer cavity 142, for purposes previously discussed. Finally, a layer of insulation 172 may be provided on the interior surface of storage plate 146, to reduce heat losses. Of course, if the siding is assembled to a masonry structure, it may be desirable to omit insulation 172 to allow the masonry to absorb and store heat.

Having described our invention in sufficient detail to enable those skilled in the art to make and use it, we claim:

1. An improved solar heat collector, comprising:
    a housing having a front for facing the sun, a back for facing adjacent support structure and peripheral walls extending between said front and back;
    at least one heat absorber element positioned within said housing, said absorber element having a first front surface for facing the sun, said first front surface having a low thermal emittance and a high solar absorptance, said absorber element also having a first rear surface for facing away from the sun, said first rear surface having a high thermal emittance and a low solar absorptance;
    at least one heat storage element positioned within said housing and spaced from said first rear surface to define a volume therebetween, said storage element having a second front surface facing toward said first rear surface, said second front surface having, like said first rear surface, a high thermal emittance and a low solar absorptance, said storage element also having a second rear surface for facing away from the sun, said second rear surface having, like said first front surface, a low thermal emittance and a high solar absorptance;
    means for closing said volume between said first rear surface and said second front surface to define a heat transfer cavity into which heat transfer is maximized from both said absorber element and said storage element but from which heat loss is minimized to both said absorber element and said storage element, as a result of the differences in thermal emittance and solar absorptance between said first front and rear surfaces and said second front and rear surfaces, respectively; and
    means for directing a flow of air through said cavity, whereby said air is heated.

2. A solar heat collector according to claim 1, wherein the thermal emittance of said first front and said second rear surface is in the range of 0.10 to 0.12; the solar absorptance of said first front surface and said second rear surface is in the range of 0.85 to 0.96; the thermal emittance of said first rear surface and said second front surface is in the range of 0.85 to 1.0; and the solar absorptance of said first rear surface and said second front surface is in the range of 0.10 to 0.15.

3. A solar heat collector according to claim 1, further comprising fins extending into said heat transfer cavity from at least one of said first rear surface and said second front surface.

4. A solar heater according to claim 1, further comprising a layer of thermal insulation adjacent said second rear surface, said insulation being spaced from said second rear surface to define a first flow channel; further comprising means for directing a second flow of air through said first flow channel in parallel with flow through said heat transfer cavity and means for recombining said flows of air at the discharge ends of said heat transfer cavity and said first flow channel.

5. A solar heater according to claim 4, further comprising at least one light transmitting cover positioned between said peripheral walls and spaced from said first front surface of said heat absorber element to define a second flow channel; and means for directing a third flow of air through said second flow channel in parallel with flow through said heat transfer cavity and said first flow channel.

6. A solar heat collector according to claim 1, further comprising means for mounting said collector as an awning on a building.

7. A solar heat collector according to claim 1, wherein said heat absorber and heat storage elements are situated about an upright axis, further comprising a columnar light transmitting element spaced from the front surface of said heat absorber element.

8. An improved solar heat collector, comprising:
    at least one horizontally elongated heat absorber element having a first front surface for facing the sun, said first front surface having a low thermal emittance and a high solar absorptance, said absorber element also having a first rear surface for facing away from the sun, said first rear surface having a high thermal emittance and a low solar absorptance, said heat absorber element being angled to optimize absorption of solar energy;
    at least one horizontally elongated heat storage element spaced from said first rear surface to define a volume therebetween, said storage element having a second front surface facing toward said first rear surface, said second front surface having, like said first rear surface, a high thermal emittance and a low solar absorptance, said storage element also having a second rear surface for facing away from the sun, said second rear surface having, like said first front surface, a low thermal emittance and a high solar absorptance;
    means for closing said volume between said first rear surface and said second front surface to define a heat transfer cavity into which heat transfer is maximized from both said absorber element and said storage element but from which heat loss is minimized to both said absorber element and said storage element, as a result of the differences in thermal emittance and solar absorptance between said first front and rear surfaces and said second front and rear surfaces, respectively; and
    means for directing a flow of air through said cavity, whereby said air is heated.

9. A solar heat collector according to claim 8, wherein the thermal emittance of said first front and said second rear surface is in the range of 0.10 to 0.12; the solar absorptance of said first front surface and said second rear surface is in the range of 0.85 to 0.96; the thermal emittance of said first rear surface and said second front surface is in the range of 0.85 to 1.0; and the solar absorptance of said first rear surface and said second front surface is in the range of 0.10 to 0.15.

10. A solar heat collector according to claim 9, wherein said heat transfer cavity is open at its horizontally spaced ends; and said means for directing a flow of air comprises upright manifold means operatively connected to said ends for permitting cool and heated air to flow into and from said heat transfer cavity.

11. A solar heat collector according to claim 8, further comprising means for attaching successive horizontally extending collectors to each other and to a structure to form siding on the structure.

12. A solar heat collector according to claim 8, further comprising fins extending into said heat transfer cavity from at least one of said first rear surface and said second front surface.

* * * * *